United States Patent [19]

Furrey

[11] 4,346,586
[45] Aug. 31, 1982

[54] ENGINE KNOCK SIGNAL PROCESSING CIRCUIT

[75] Inventor: John H. Furrey, Schaumburg, Ill.

[73] Assignee: Motorola Inc., Schaumburg, Ill.

[21] Appl. No.: 171,230

[22] Filed: Jul. 22, 1980

[51] Int. Cl.³ .......................... G01L 23/22; F02P 5/04
[52] U.S. Cl. ......................................... 73/35; 123/425
[58] Field of Search ...................... 73/35; 123/425, 435

[56] References Cited

U.S. PATENT DOCUMENTS

| | | | |
|---|---|---|---|
| 4,111,035 | 9/1978 | West et al. ............................... | 73/35 |
| 4,271,469 | 6/1981 | Kawai et al. ......................... | 73/35 X |
| 4,271,799 | 6/1981 | Kato et al. ........................... | 123/425 |
| 4,279,143 | 7/1981 | Guipaud ................................ | 73/35 |

*Primary Examiner*—James J. Gill
*Attorney, Agent, or Firm*—James W. Gillman; James S. Pristelski; Phillip H. Melamed

[57] ABSTRACT

An analog signal processing circuit for detecting engine knock is disclosed. A sensor mechanically resonant at characteristic engine knock frequencies provides an analog signal related to engine knock and engine background noise. An envelope detector provides the signal envelope of the sensor signal. An integrator means provides an average signal related to the average of the envelope signal while an attenuator and subsequent filter (integrator) provide an integrated and attenuated signal which responds faster to amplitude changes in the envelope signal than the average signal. The integrated and attenuated signal level is set below the average signal level for conditions of no-knock. A comparator receives both the average signal and the integrated and attenuated signal and provides an output signal indicating knock detection in response to the amplitude of the integrated and attenuated signal exceeding the amplitude of the average signal. Preferably the knock detection output of the comparator is latched and the comparator is reset by periodic engine pulses.

9 Claims, 3 Drawing Figures

ENGINE KNOCK SIGNAL PROCESSING CIRCUIT

BACKGROUND OF THE INVENTION

The present invention relates generally to the field of analog signal processing circuits, and more particularly to the flied of analog signal processing circuits utilized to detect engine knock conditions in automobile internal combustion engines.

During the operation of automobile internal combustion engines, many times it is necessary to detect the condition of engine knock wherein this condition is characterized by an excessively loud noise level, above the normal background engine vibration noise level for a particular engine speed, being generated by the engine due to excessive engine vibration. Typically, engine knock exists for a relatively long time after each spark ignition, whereas normal engine operation would produce, at most, only short duration, high amplitude noise and would in general produce a low amplitude background noise signal related to engine speed. It is possible to eliminate or minimize engine knock by adjusting the time occurrence of spark ignition for the internal combustion engine. Thus, some prior systems have utilized knock detection circuits to develop control voltages for controlling engine spark timing.

Typically, engine knock sensors, generally corresponding to vibration sensors, have been utilized to detect knock by producing electrical signals in accordance with sensed engine vibrations. During a condition of engine knock, the amplitude of these vibrations will greatly increase in a specific band of "knock frequencies" which are characteristic of the mechanical construction of the internal combustion engine. Prior knock sensor circuits have attempted to detect engine knock through the utilization of analog signal processing circuits which receive the engine knock sensor signal. For various reasons, prior analog engine knock signal processing circuits have proved unsatisfactory due to either their excessive cost and complexity, their failure to adequately distinguish between an engine knock condition and normal engine background noise, or their failure to provide a circuit having an engine knock detection characteristic which can be readily adjusted to provide a desired relationship between the severity of the engine vibrations resulting from engine knock and varying amplitudes of engine vibrations resulting from normal engine operation. Typically, a knock detection characteristic is desired which requires larger amplitude vibrations to indicate a knock condition (excessive engine noise) as normal engine background noise increases, such as would occur when the operating speed of the engine increases.

Some prior knock detection circuits compare the amplitude of the engine vibration signal to a fixed reference level in order to detect engine knock. These circuits do not provide the desired engine knock detection characteristic and they ignore the fact that the amplitude of the engine vibration signal is actually a composite of engine knock signal amplitudes and typical engine vibration noise. Some knock detection circuits have attempted to process the knock sensor signal by effectively compensating for the effect of background noise on the amplitude of the engine vibration sensor signal during engine knock conditions. These circuits have generally been costly and complex and hard to adjust to obtain a specific desired knock detection characteristic for varying amounts of engine background noise. Generally, the prior knock detection circuits have also had problems in adequately distinguishing short duration, high amplitude engine background noise from the longer duration, high amplitude signals characteristic of engine knock.

SUMMARY OF THE INVENTION

An object of the present invention is to provide an improved analog engine knock signal processing circuit which overcomes the aforementioned deficiencies and provides a desired engine knock detection characteristic for varying amplitudes of engine background noise which can be readily adjusted.

In one embodiment of the present invention, an analog engine knock signal processing circuit is provided which includes: engine knock sensor means for providing an analog engine knock signal representative of engine knock and engine background noise; detector means, including a rectifier means, coupled to said knock sensor means for receiving and rectifying said knock signal and developing an envelope output signal, at an envelope terminal, representative of the peak magnitude signal envelope of the knock signal; integrator means coupled to said envelope terminal for receiving and integrating said envelope signal and providing an average signal related to the average magnitude of said envelope signal, said average signal being provided at an average terminal, the amplitude of said average signal having a first response time in response to amplitude changes in said envelope signal; attenuator means coupled to said envelope terminal for receiving said envelope signal and providing an amplitude attenuated signal related to a predetermined amplitude attenuation of said envelope signal, the amplitude of said attenuated signal responding to changes in the magnitude of said envelope signal faster than the amplitude of said average signal, said attenuator means including circuitry for adjusting the amplitude of said attenuated signal to less than the amplitude of the average signal for constant amplitudes of said envelope signal; and comparator means coupled to both said integrator means and said attenuator means for receiving both said average signal and said attenuated signal and providing a knock detection output signal at an output terminal in response to the amplitude of a faster responding signal derived from said attenuated signal exceeding the amplitude of said average signal, whereby by adjusting the attenuation of the attenuator means desired knock detection characteristics of the signal processing circuit for varying amplitudes of engine background noise can be readily obtained.

Basically, the present invention involves developing an envelope signal related to the envelope of the rectified sensor signal produced by an engine knock sensor which senses engine vibrations. This envelope signal is received by an integrator means that provides an average signal related to the average magnitude of the envelope signal. The envelope signal is also received by an attenuator which provides a predetermined amount of AC and DC attenuation to the envelope signal. Then, preferably, a filter, which is an additional integrator circuit, receives this attenuated signal and provides an integrated attenuated signal related to the envelope signal wherein this integrated attenuated signal will respond faster to changes in the amplitude of the envelope signal than the average signal. The integrated attenuated signal has its magnitude adjusted to be less than the average signal magnitude for constant amplitudes of the envelope signal and both the integrated attenuated signal and the average signal are then received by a comparator which compares the amplitudes of these signals and produces a knock detection in response to the integrated attenuated signal exceeding the average signal.

Essentially, during normal engine operation without the existence of engine knock, the level of the integrated attenuated signal will be below the level of the average signal due to the predetermined attenuation and a possible DC offset bias and therefore the comparator will not indicate engine knock. When engine knock occurs, the integrated attenuated signal will increase at a more rapid rate than the average signal resulting in the integrated attenuated signal eventually exceeding the average signal thereby causing the comparator to indicate a knock condition. Preferably, the comparator includes a latch circuit structure comprising signal feedback from the output of the comparator to one of its inputs so that the comparator will continue to indicate the condition of knock until it is reset by periodic reset pulses which can be either engine position pulses or spark ignition pulses.

Through the utilization of the attenuator, the DC offset bias, and the filter (wherein the response time of the filter can be adjusted) any desired engine knock detection characteristic can be obtained. Preferably, DC continuity is maintained between the envelope signal and the comparator by both the integrator which produced the average signal and the attenuator means which provides the integrated attenuated signal. In this manner, both the integrated attenuated signal and the average signal will be adjusted by various amplitudes in response to changes in the DC level of the envelope signal, but more significantly the circuit also provides different adjustments for the integrated attenuated and average signals in response to AC changes of the envelope signal. This has been found to be desirable in order to obtain a desired knock detection threshold versus engine background noise characteristic. The present invention accomplishes this without the use of amplifier means for producing either the integrated average signal or the attenuated signal, thus DC offsets and DC drifts due to amplifiers are of little concern in the present embodiment whereas these factors impair the stability performance of prior knock signal detection processor circuits besides adding to the cost of those circuits.

It should be noted that preferably the attenuated envelope signal is first integrated by the filter before applying this resultant signal to the comparator means. While this filtering aids in preventing short duration, engine noise spikes from being intepreted as engine knock, the present invention also functions satisfactorily, in some applications, if the attenuated envelope signal is directly coupled to the comparator means.

BRIEF DESCRIPTION OF THE DRAWINGS

For a more complete understanding of the invention, reference should be made to the drawings, in which.

DESCRIPTION OF THE PREFERRED EMBODIMENT

Figure 1:
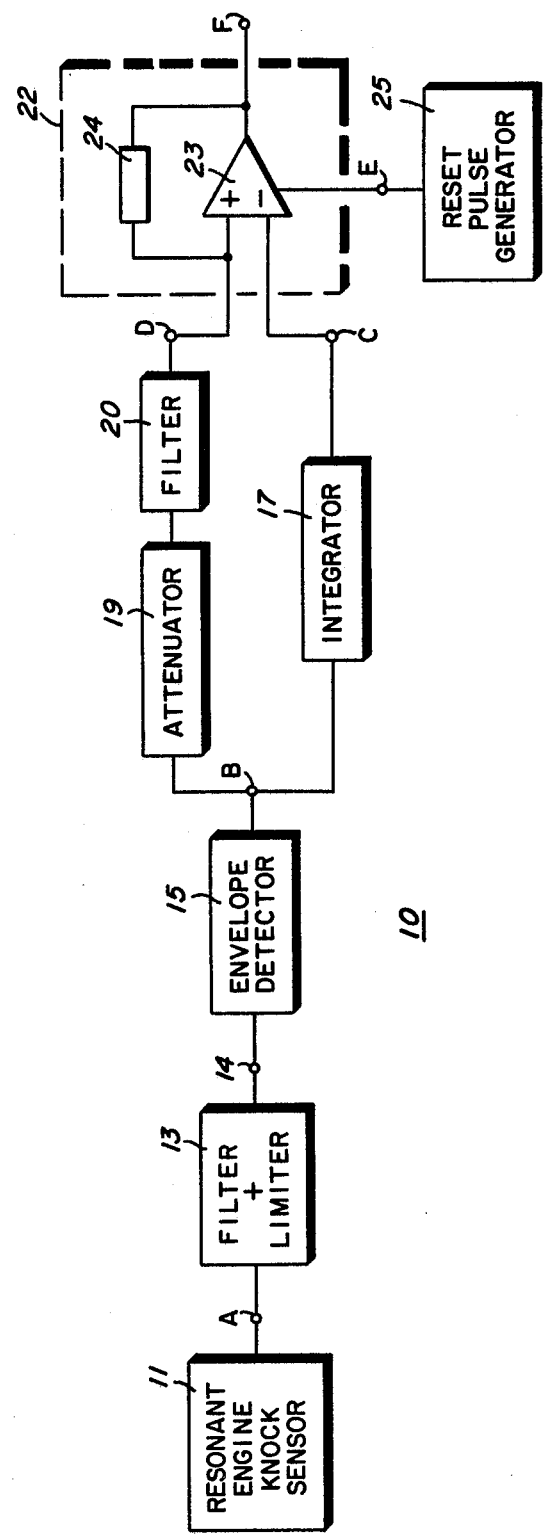
FIG. 1 is a block diagram of an engine knock detector circuit utilizing the analog signal processing circuit of the present invention.

FIG. 1 illustrates a knock detection system 10 which includes a resonant engine knock sensor 11 that is mechanically resonant at the predetermined knock frequency band of an associated internal combustion engine (not shown) for which it is desired to detect engine knock. Typically the resonant engine knock sensor comprises either a piezoelectric sensor or an accelerometer type sensor which is mounted to the internal combustion engine. The resonant sensor provides analog electrical output signals at a terminal A wherein these signals have magnitudes related to the intensity of the mechanical vibrations of the engine. These engine vibrations will increase dramatically during engine knock and at other times are related to general background engine noise.

Figure 3:
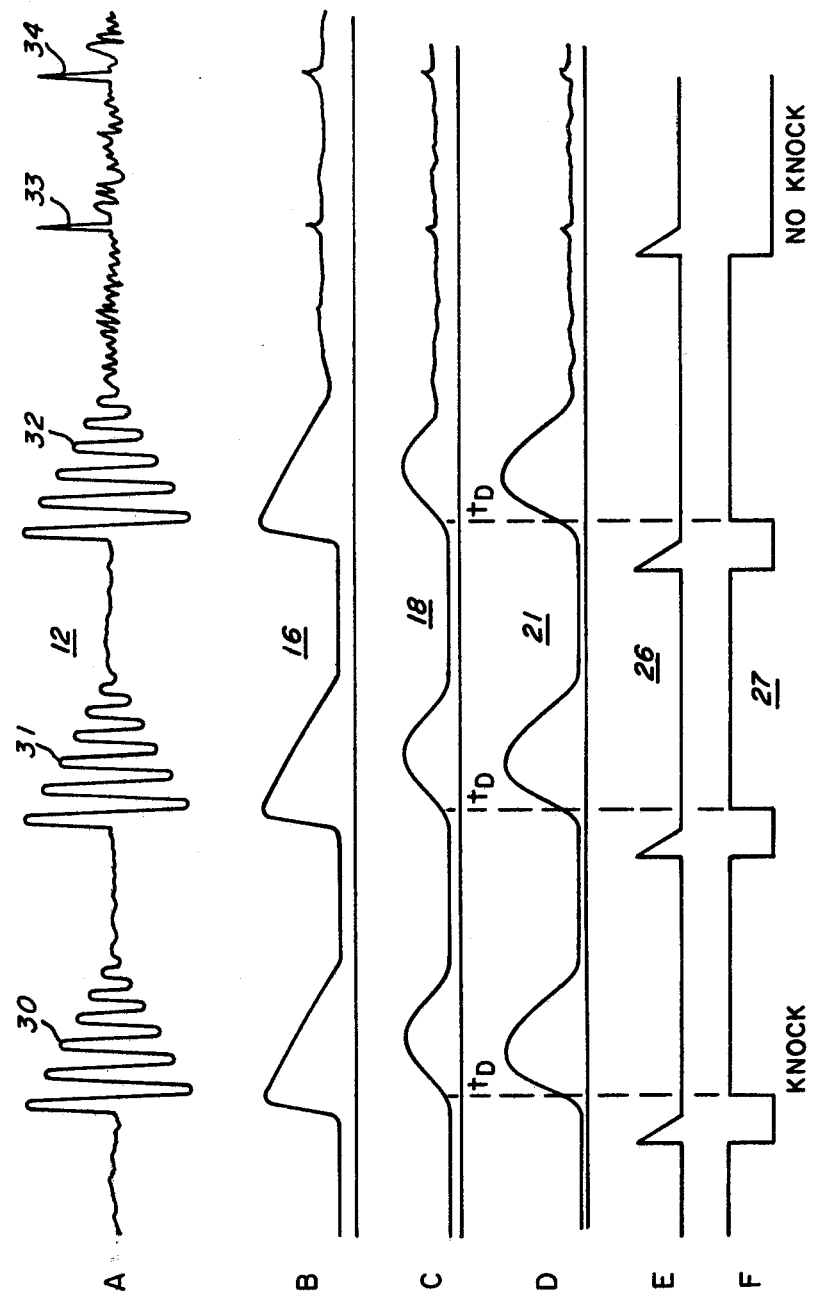
FIGS. 3A through 3F are a series of graphs illustrating signal waveforms at various terminals of the circuits shown in FIGS. 1 and 2.

FIG. 3A illustrates a typical analog engine knock sensor signal 12 produced at the terminal A wherein the signal 12 illustrates three pulse durations 30, 31 and 32 representative of engine knock followed by a general increase in the background noise existing after the third occurrence of engine knock. It should be noted that the engine knock phenomenon predictably occurs if it occurs at all, at a predetermined time with respect to each spark ignition created for the internal combustion engine. In addition, the duration of engine knock is typically longer than occasional engine noise spikes such as 33 and 34 in FIG. 3A. It should also be noted that since the knock sensor 11 is resonant at the knock frequency band, this will result in the signals at the terminal A at the knock frequencies being amplitude emphasized relative with respect to signals at the terminal A produced for all other frequencies. This aids in distinguishing between engine knock and general background noise.

Figure 2:
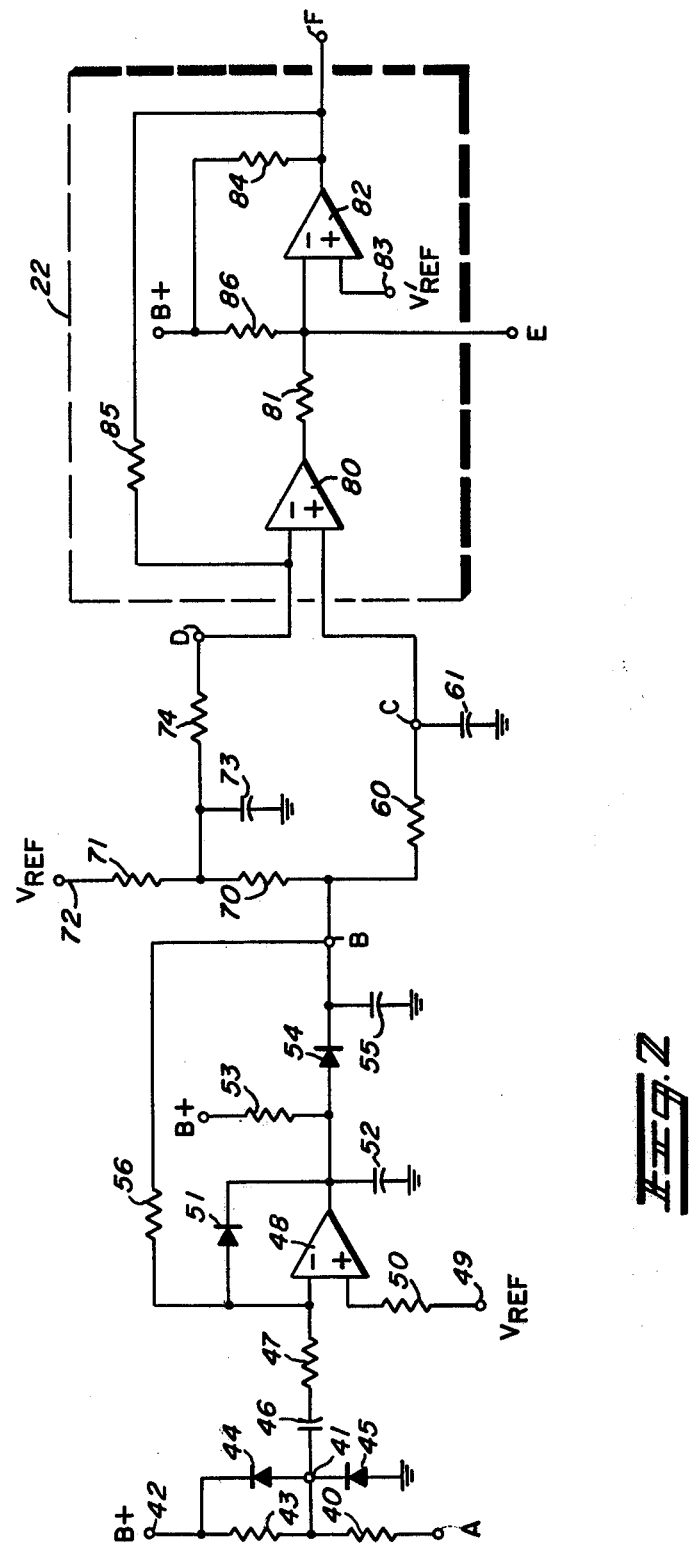
FIG. 2 is a more detailed schematic diagram of the circuit shown in FIG. 1.

The knock sensor 11 and its output terminal A are connected as an input to a filter and limiter stage 13 which provides an output signal at a terminal 14. The stage 13 includes filter circuitry so that the signal at the terminal 14 will not be substantially affected by frequencies either below or above the knock frequencies, typically this would be accomplished by high-pass, low-pass, or bandpass filter circuitry. The stage 13 also ensures that the signal at the terminal 14 is not affected by extremely large amplitude signals produced at the terminal A, and this is implemented by amplitude limiting circuitry. FIG. 2 illustrates a typical embodiment of the processing circuit 10 and the stage 13 and the construction and operation of the stage 13 will be discussed in detail subsequently.

The analog signal at the terminal 14 in FIG. 1 is coupled as an input to an envelope detector circuit 15 which includes a rectifier component. The detector 15 receives the signal at the terminal 14 and provides in response thereto an envelope output signal 16 at an envelope output terminal B. FIG. 3B illustrates the signal waveform of the envelope signal at the terminal B produced in response to the signal 12 provided at the terminal A.

The envelope output terminal B is coupled as an input to a slow response time integrator circuit 17 which receives the envelope signal 16 and provides an average signal 18 related to the average amplitude of the signal 16 at an average terminal C. FIG. 3C illustrates a waveform corresponding to the average signal 18 provided at the terminal C in response to the envelope signal 16 at the terminal B.

The terminal B is also coupled as an input to an attenuator circuit 19 which supplies an input to a filter circuit 20 which essentially comprises a fast response time integrator circuit wherein the response time of the integrator 20 is faster than the response time of the integrator 17 with respect to the response of these circuits to envelope signal amplitude changes. The output of the filter circuit 20 is provided at a terminal D at which an integrated amplitude attenuated signal 21 is produced which is related to a predetermined amplitude attenuation of the envelope signal 16 at the terminal B. FIG. 3D illustrates a waveform representative of the signal 21 at the terminal D produced in response to the envelope signal 16 at the terminal B.

A comparator means 22 is illustrated in FIG. 1 in dashed form as comprising a level comparator circuit 23 having its inverting input directly connected to the terminal C and having its non-inverting input directly connected to the terminal D. In addition, feedback circuitry 24 is illustrated as being connected between the non-inverting input terminal of the circuit 23 and an output terminal F corresponding to the output of the comparator 23. A reset pulse generator 25 is illustrated as providing reset pulses at a terminal E which is coupled to the comparator circuit 23 for resetting the comparator after a detection of knock has occurred since the feedback circuit 24 results in latching the output of the comparator 23, once knock is detected, by changing the voltage at the non-inverting input terminal so that the output of the circuit 23 will be maintained at a level indicating knock detection until it is reset.

It should be noted that the attenuator 19 and filter 20 in FIG. 1 are contemplated as providing DC continuity between the terminals B and D and the integrator circuit 17 also provides DC continuity between the terminal B and the terminal C. In this manner, any DC changes at the terminal B will be reflected in corresponding changes at the terminals D and C. More significantly, it should be noted that the comparator receives an average signal related to the AC average of the envelope signal and an integrated and AC attenuated signal related to the envelope signal.

It should also be noted that FIG. 3E illustrates the waveform of a typical signal 26 representative of the periodic reset pulses provided at the terminal E, and FIG. 3F illustrates a signal waveform representative of an output knock detection signal 27 provided at the terminal F by the comparator circuit 23.

The operation of the signal processing circuit 10 in FIG. 1 will now be briefly summarized. Subsequently, the operation of this circuit will be explained in detail in conjunction with the description of the more detailed circuitry shown in FIG. 2 and the signal waveform shown in FIGS. 3A through 3F. In all of the figures, identical numbers and reference letters have been utilized to identify corresponding components.

Essentially, the knock sensor 11 provides a peak-to-peak AC knock frequency emphasized signal at the terminal A wherein signals at the knock frequency are amplitude emphasized over other signals. The filter and limiter 13 provides additional emphasis for the knock frequency signals with respect to other frequency signals and also amplitude limits the magnitude of the signals present at the terminal A. It should be noted that background noise is contemplated as being superimposed uniformly throughout the frequency band of all signals produced by the knock sensor 11. This means that even at knock frequencies, there will be engine background noise and the fact that the knock sensor 11 is resonant and that the filter component of the stage 13 eliminates other frequencies than knock does not eliminate the portion of the background noise which is generated in the knock frequency band.

The signal provided at the terminal 14 by the component 13 is an input to the envelope detector 15 which provides an envelope signal at the terminal B wherein the amplitude of this envelope signal is representative of engine knock and background noise, just as the peak-to-peak amplitude of the signal at the terminal A was representative of engine knock and engine background noise. It is contemplated that the envelope signal 16 is produced by rectifying the peak-to-peak AC sensor signal 12 and then peak detecting this signal also through the use of a rectifier.

The integrator circuit 17 provides the signal 18 which essentially corresponds to the average value of the rectified envelope signal 16 at the terminal B. Changes in the amplitude of the envelope signal 16 result in relatively slow corresponding changes in the average signal due to the relatively slow response time of the integrator 17.

The attenuator 19 provides both DC and AC attenuation for the envelope signal 16 at the terminal B, and the filter 20 which follows the attenuator 19 results in providing a smoothed out or partially integrated signal 21 at the terminal D which has been attenuated by the attentuator 19. It is significant to note that in the preferred embodiment of the present invention the response time of the filter 20, which essentially performs an integration function, is substantially faster than the response time of the integrator 17. This can be illustrated by comparing the signals 16, 18 and 21 as shown in FIGS. 3B, 3C and 3D. It should also be noted that the amplitude of the integrated attenuated signal 21 is contemplated as normally being substantially less than the unattenuated average signal 18 at the terminal C. This is accomplished by DC offset bias circuitry and the attenuation of attenuator 19.

If engine knock has not occurred, it is contemplated that the larger magnitude signal 18 at the terminal C as compared to the integrated attenuated signal 21 at the terminal D will result in having the comparator circuit 23 provide a low output at the terminal F indicating an absence of engine knock. It is also contemplated that the signal at the terminal F will be utilized by additional engine control circuitry (not shown) to control the spark timing of an internal combustion engine in accordance with whether or not engine knock has been detected.

If engine knock occurs, the knock sensor 11 by virtue of its mechanical connection to the engine will generate a high amplitude burst of signal at the characteristic knock frequency band of the engine. Such signal bursts are illustrated in the signal 12 shown in FIG. 3A as knock bursts 30, 31 and 32. These knock bursts result in corresponding amplitude increases in the envelope signal 16. These amplitude increases in the envelope signal 16 then provide corresponding amplitude increases in both the average signal 18 and in the integrated attenuated signal 21 wherein it is significant to note that the attenuated signal 21 will respond much more rapidly to the amplitude changes in the signal 16 than the average signal 18 due to the faster response of the integrating filter 20 as compared to the integrator circuit 17. It is contemplated that the amount of attenuation of the attenuator 19 and the DC offset bias provided by the attenuator 19 and filter 20 is selected such that by selecting the time constants for the filter 20 and integrator 17, that for a sufficient duration of engine knock pulses (like the pulses 30, 31 and 32) the magnitude of the attenuated signal 21 will exceed the magnitude of the average signal 18. This will result in having the comparator 23 provide a high output indicating a detection of engine knock, and the latch feedback circuit 24 will insure that the signal at the non-inverting input terminal of the comparator 23 will remain high and therefore effectively latch the output of the comparator until the comparator is reset by periodic reset pulses corresponding to the signal 26 which can be provided either by a crankshaft position sensor or can be implemented in response to spark ignition. It should be noted that the effect of circuit 24 is not illustrated in FIG. 3D for clarity purposes.

It has been found that the circuit 10 shown in FIG. 1 can provide an accurate indication of engine knock while providing a desired characteristic of detecting engine knock versus engine background noise and this has been accomplished without the use of any amplifier devices between the terminal B and the comparator 23 wherein the use of these amplifier devices would add to the cost of the detector circuit and jeopardize the stability of the detector circuit due to the DC offset levels and DC drifts inherent in such amplifiers. In addition, the use of the envelope signal and the filter 20 provide for partially immunizing the circuit 10 from short duration noise spikes such as 33 and 34 since in generating the envelope signal the effect of these signals is reduced and since the integrating filter 20 effectively delays the response of the signal 21 of terminal D so that only for high amplitude pulses of sufficient duration will knock be detected.

Referring to FIG. 2, a more specific embodiment of the engine knock circuit 10 is illustrated. The knock sensor 11, which is contemplated as being directly mounted to the engine block to sense engine vibrations, has its output terminal A coupled through a resistor 40 to an intermediate terminal 41 which is coupled to a power supply B+ terminal 42 through the parallel connection of a resistor 43 and a diode 44 having its cathode directly connected to the terminal 42. The terminal 41 is also coupled to ground through a diode 45 having its anode directly connected to ground. The function of the diodes 44 and 45 is essentially to limit the amplitude of signals at the terminal 41 to between predetermined limits since it was found that the signals at the terminal A may exceed the magnitude of signals which are desired for the analog signal processing circuit.

The terminal 41 is coupled through a series connected high-pass capacitor 46 and resistor 47 to the inverting input terminal of an operational amplifier 48 which has its non-inverting input terminal connected to a reference voltage terminal 49 through a resistor 50. A diode 51 is connected between the inverting input terminal and an output terminal of the operational amplifier 48 and a low-pass capacitor 52 is coupled between the output of the amplifier 48 and ground with the output terminal also being connected to B+ through a resistor 53. The output of the amplifier 48 is coupled to the anode of a peak detector rectifying diode 54 which has its cathode directly connected to the terminal B wherein this terminal is also connected to ground through a low-pass filter capacitor 55 and is connected to the inverting input terminal of the operational amplifier 48 through a resistor 56.

Essentially, the components 40 through 56 implement the filter and limiter stage 13 and the envelope detector 15 shown in FIG. 1 wherein the capacitors 46, 52 and 55 form a bandpass filter for the knock frequency band. The operational amplifier 48 provides amplification to the signal passed between the terminals A and B and the diode (rectifier) 54 and capacitor 55 perform an envelope detected (peak) function for the output signal of the amplifier 48 and thus creates the envelope signal 16 at the terminal B. The capacitor 55 provides a first order response for the signal 16 and thereby moderates, somewhat, the effect of short duration engine noise pulses on the signal 16.

The terminal B is connected through a series resistor 60 to the terminal C which is coupled to ground through an integrating capacitor 61. The magnitudes of the resistor 60 and capacitor 61 are selected so that these components, which form the integrator 17, will have a time constant giving the integrator a relatively slow response time in response to amplitude changes at the terminal B. The capacitor 61 provides the signal 18 at terminal C with a second order response to short duration engine noise spikes and therefore further minimizes their effect on the average signal 18.

The terminal B is also connected through a series resistor divider comprising a resistor 70 and a resistor 71 to a reference terminal 72 at which a DC reference potential is supplied. The resistors 70 and 71 effectively form an AC and DC resistor divider attenuator corresponding to the attenuator 19. The connection point between the resistors 70 and 71 is coupled to ground through a filter capacitor 73 and coupled through a resistor 74 to the terminal D wherein the capacitor 73, in combination with the magnitude of the parallel combination of resistors 70 and 71, forms the integrating filter 20 which has a time constant allowing the signal at the terminal D to more rapidly respond to amplitude changes at the terminal B than the signal at the terminal C. It should be noted that the capacitor 73 provides the signal 21 at terminal D with a second order response to short duration engine noise spikes thus minimizing their effect on the magnitude of the signal 21. This is significant since the magnitude of signal 21 is utilized in detecting knock. However, even without capacitor 73 the present circuit will function since the signal at terminal D will still be an attenuated signal responding faster to envelope signal magnitude changes than the average signal 18.

The attenuated signal provided at the terminal D is directly coupled to the inverting input terminal of a DC level comparator 80 which has its non-inverting input terminal directly connected to the terminal C. The output of the level comparator 80 is coupled through a resistor 81 to the non-inverting input terminal of another DC level comparator 82 having its non-inverting input terminal connected to a reference voltage at a terminal 83. The output of the comparator 82 is directly connected to the terminal F, connected to the B+ terminal through a resistor 84, and connected to the terminal D through a latching feedback resistor 85 which results in latching the output of the series combination of the comparators 80 and 82 which essentially together function as a latchable flip-flop circuit. When the signal magnitude at the inverting terminal of comparator 80 exceeds the signal magnitude at the non-inverting terminal by the comparator threshold magnitude, knock is indicated by changing the output states of comparators 80 and 82.

The inverting input terminal of the comparator circuit 82 is coupled to the B+ terminal through a resistor 86 and is directly connected to the terminal E at which the reset pulse generator 25 provides periodic reset pulses for resetting the output of the series combination of the comparators 80 and 82. It should be noted that the reference voltage at terminal 72 is used to adjust the DC level of the signal 21 at terminal D, and this voltage provides an identical tracking DC voltage for both of the signals at terminals C and D. This tracking DC voltage, in combination with the unequal signal gain paths for the envelope signal 16, is used to ensure that for constant amplitudes of the envelope signal 16, the voltage at terminal C will exceed that at terminal D, thus indicating no engine knock. Also it should be noted that exactly the same reference voltage is provided to terminals 49 and 72 so that if the voltage drifts causing changes in the AC output of amplifier 48, the DC levels of the signals 21 and 18 will also be adjusted to compensate. If needed a fixed offset voltage could be provided between the voltage at term. 49 and 72. As a final point, it should be appreciated that as engine background noise increases, for example, the difference between the non-knock signal levels of the signals 18 and 21 will increase, thus insuring that for increased background noise knock detection requires even larger magnitude knock signal bursts. This knock detection characteristic is desired, as was previously mentioned, and is due to the attenuator 19 attenuating the effect of increased background noise on the signal 21 while not attenuating the effect of the increase on the signal 18.

The specific elements shown in FIG. 2 implement the block elements shown in FIG. 1 and the operation of the individual devices in FIG. 2 is well known to those of average skill in the art. It is contemplated that the knock detection signal provided at the terminal F will be utilized by additional circuitry (not shown) for the control of spark timing ignition of the internal combustion engine to which the knock sensor 11 is mounted. Several such prior art systems exist and are known to those of skill in the art who will appreciate that the present circuit has implemented a stable relatively inexpensive knock detection circuit which can be adjusted to provide a desired characteristic for detecting engine knock while distinguishing this phenomenon from short duration noise spikes and engine background noise.

While I have shown and described a specific embodiment of this invention, further modifications and improvements will occur to those skilled in the art. All such modifications which retain the basic underlying principles disclosed and claimed herein are within the scope of this invention.

I claim:

1. An analog engine knock signal processing circuit comprising:
    engine knock sensor means for providing an analog engine knock signal representative of engine knock and engine background noise;
    detector means, including a rectifier means, coupled to said knock sensor means for receiving and rectifying said knock signal and developing an envelope output signal, at an envelope terminal, representative of the peak magnitude signal envelope of the knock signal;
    integrator means coupled to said envelope terminal for receiving and integrating said envelope signal and providing an average signal related to the average magnitude of said envelope signal, said average signal being provided at an average terminal, the amplitude of said average signal having a first response time in response to amplitude changes in said envelope signal,
    attenuator means coupled to said envelope terminal for receiving said envelope signal and providing an amplitude attenuated signal related to a predetermined amplitude attenuation of said envelope signal, the amplitude of said attenuated signal responding to changes in the magnitude of said envelope signal faster than the amplitude of said average signal, said attenuator means including circuitry for adjusting the amplitude of said attenuated signal to less than the amplitude of said average signal for constant amplitudes of said envelope signal; and
    comparator means coupled to both said integrator means and said attenuator means for receiving both said average signal and said attenuated signal and providing a knock detection output signal at an output terminal in response to the amplitude of a faster responding signal derived from said attenuated signal exceeding the amplitude of said average signal, whereby by adjusting the amount of attenuation of said attenuator means, desired knock detection characteristics of the signal processing circuit for varying amplitudes of engine background noise can be readily obtained and by using the envelope signal some immunity from falsely detecting short duration engine noise spikes as engine knock is obtained.

2. An analog engine knock signal processing circuit according to claim 1 wherein said engine knock sensor means is a resonant sensor at characteristic knock frequencies such that signals at knock frequencies are amplitude emphasized substantially more than signals at all other frequencies.

3. An analog engine knock signal processing circuit comprising:
    engine knock sensor means for providing an analog engine knock signal representative of engine knock and engine background noise;
    detector means, including a rectifier means, coupled to said knock sensor means for receiving and rectifying said knock signal and developing an envelope output signal, at an envelope terminal, representative of the peak magnitude signal envelope of the knock signal;
    integrator means coupled to said envelope terminal for receiving and integrating said envelope signal and providing an average signal related to the average magnitude of said envelope signal, said average signal being provided at an average terminal, the amplitude of said average signal having a first response time in response to amplitude changes in said envelope signal,
    attenuator means coupled to said envelope terminal for receiving said envelope signal and providing an amplitude attenuated signal related to a predetermined amplitude attenuation of said envelope signal, the amplitude of said attenuated signal responding to changes in the magnitude of said envelope signal faster than the amplitude of said average signal, said attenuator means including circuitry for adjusting the amplitude of said attenuated signal to less than the amplitude of said average signal for constant amplitudes of said envelope signal;

comparator means coupled to both said integrator means and said attenuator means for receiving both said average signal and said attenuated signal and providing a knock detection output signal at an output terminal in response to the amplitude of a faster responding signal derived from said attenuated signal exceeding the amplitude of said average signal, whereby by adjusting the amount of attenuation of said attenuator means, desired knock detection characteristics of the signal processing circuit for varying amplitudes of engine background noise can be readily obtained and by using the envelope signal some immunity from falsely detecting short duration engine noise spikes as engine knock is obtained; and an amplitude limiting stage between said engine knock sensor means and said envelope detector means for limiting the maximum amplitude of signals provided by said sensor means to said detector means, whereby the maximum effect of sensor signals on the envelope signal is controlled.

4. An analog engine knock signal processing circuit according to claim 1 wherein both said integrator means and said attenuator means provide DC continuity between said envelope terminal and said comparator means, wherein DC changes at said envelop terminal will cause corresponding DC changes in both said average signal and said attenuated signal which are compared by said comparator means.

5. An analog engine knock signal processing circuit according to claims 1 or 4 wherein said attenuator means includes a resistor divider circuit providing signal attenuation and wherein said attenuator means includes a signal integrator circuit having a response time which is faster than the response time of said integrator means, wherein said comparator means will effectively compare the amplitude responses of the average integrator means with the amplitude attenuated response of said integrator circuit of said attenuator means in response to amplitude changes in said envelope signal.

6. An analog engine knock signal processing circuit comprising:

engine knock sensor means for providing an analog engine knock signal representative of engine knock and engine background noise;

detector means, including a rectifier means, coupled to said knock sensor means for receiving and rectifying said knock signal and developing an envelope output signal, at an envelope terminal, representative of the peak magnitude signal envelope of the knock signal;

integrator means coupled to said envelope terminal for receiving and integrating said envelope signal and providing an average signal related to the average magnitude of said envelope signal, said average signal being provided at an average terminal, the amplitude of said average signal having a first response time in response to amplitude changes in said envelope signal, attenuator means coupled to said envelope terminal for receiving said envelope signal and providing an amplitude attenuated signal related to a predetermined amplitude attenuation of said envelope signal, the amplitude of said attenuated signal responding to changes in the magnitude of said envelope signal faster than the amplitude of said average signal, said attenuator means including circuitry for adjusting the amplitude of said attenuated signal to less than the amplitude of said average signal for constant amplitudes of said envelope signal;

comparator means coupled to both said integrator means and said attenuator means for receiving both said average signal and said attenuated signal and providing a knock detection output signal at an output terminal in response to the amplitude of a faster responding signal derived from said attenuated signal exceeding the amplitude of said average signal, whereby by adjusting the amount of attenuation of said attenuator means, desired knock detection characteristics of the signal processing circuit for varying amplitudes of engine background noise can be readily obtained and by using the envelope signal some immunity from falsely detecting short duration engine noise spikes as engine knock is obtained; and wherein said comparator means includes latch circuit means for maintaining the output of said comparator means constant in response to engine knock being detected by said attenuated signal magnitude exceeding said average signal magnitude.

7. An analog engine knock signal processing circuit according to claim 6 which includes reset circuitry for providing periodic resetting pulses for resetting said latch circuit means in said comparator means to enable the periodic detection of engine knock.

8. An analog engine knock signal processing circuit according to claim 7 wherein said latch circuit means includes signal feedback circuit means coupled from the comparator means output terminal to an input terminal of the comparator means for changing the signal magnitude at the input terminal in response to output terminal magnitude changes, whereby the engine knock signal provided at the output terminal is utilized to latch the output of the comparator means until the comparator means is reset by said reset circuitry.

9. An analog engine knock signal processing circuit according to claim 5 wherein said integrator circuit receives an attenuated signal from said resistor divider circuit and in response thereto provides said attenuated signal, which has now been integrated to said comparator means.

* * * * *